United States Patent
Shinto

(10) Patent No.: US 9,560,164 B2
(45) Date of Patent: Jan. 31, 2017

(54) IMAGE PROCESSING APPARATUS, METHOD OF CONTROLLING THE SAME, NON-TRANSITORY COMPUTER READABLE STORAGE MEDIUM, AND DATA PROCESSING APPARATUS

(71) Applicant: CANON KABUSHIKI KAISHA, Tokyo (JP)

(72) Inventor: Yasushi Shinto, Inagi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/608,324

(22) Filed: Jan. 29, 2015

(65) Prior Publication Data
US 2015/0229804 A1 Aug. 13, 2015

(30) Foreign Application Priority Data
Feb. 7, 2014 (JP) .................. 2014-022781

(51) Int. Cl.
H04N 1/32 (2006.01)
H04L 29/08 (2006.01)
H04N 1/00 (2006.01)

(52) U.S. Cl.
CPC ............ *H04L 67/34* (2013.01); *H04N 1/0097* (2013.01); *H04N 1/32587* (2013.01)

(58) Field of Classification Search
CPC ... H04L 67/34; H04N 1/0097; H04N 1/32122; H04N 1/00148; G06F 3/1237
See application file for complete search history.

(56) References Cited

U.S. PATENT DOCUMENTS 5,689,414 A * 11/1997 Eitrich .................. F02D 41/263 700/7
6,633,894 B1 * 10/2003 Cole .................. H03H 21/0012 375/232

(Continued)

FOREIGN PATENT DOCUMENTS

JP 2007-179358 A 7/2007
JP 2011-186981 A 9/2011

OTHER PUBLICATIONS

U.S. Appl. No. 14/625,105, filed Feb. 18, 2015.

*Primary Examiner* — Ted Barnes
(74) *Attorney, Agent, or Firm* — Fitzpatrick, Cella, Harper & Scinto

(57) ABSTRACT

An image processing apparatus, comprises: a dynamic portion reconfiguration unit configured to be able to reconfigure an internal circuit configuration dynamically and partially; and a reconfiguration control unit which controls the reconfiguration of the circuit configuration by the dynamic portion reconfiguration unit; wherein one or more processing circuits configured in the dynamic portion reconfiguration unit are each configured to include a data processing unit and a parameter holding unit for holding a parameter used for processing by the data processing unit, and for the parameter holding unit, a circuit configuration corresponding to a parameter corresponding to a setting in the processing by the data processing unit is defined, and the reconfiguration control unit, in accordance with a modification of the setting in the processing by the data processing unit, reconfigures only the circuit configuration of the parameter holding unit.

7 Claims, 9 Drawing Sheets

(56) References Cited

U.S. PATENT DOCUMENTS

| | | | | |
|---|---|---|---|---|
| 6,693,722 B1* | 2/2004 | Mixer, Jr. | G06K 15/00 | 358/1.13 |
| 6,724,943 B2* | 4/2004 | Tsuchiya | H04N 5/208 | 348/E5.076 |
| 7,457,853 B1* | 11/2008 | Chari | G06F 9/44505 | 709/217 |
| 7,669,035 B2* | 2/2010 | Young | G06F 13/4265 | 710/104 |
| 8,482,748 B2* | 7/2013 | Hara | G03G 15/5087 | 358/1.13 |
| 8,508,758 B2* | 8/2013 | Hara | G06F 3/1211 | 358/1.1 |
| 8,514,441 B2* | 8/2013 | Shinto | H04N 1/32454 | 345/537 |
| 8,559,032 B2* | 10/2013 | Christiansen | G06F 3/1204 | 358/1.1 |
| 2005/0044347 A1* | 2/2005 | Zeng | H04L 67/34 | 713/1 |
| 2006/0132874 A1* | 6/2006 | Ishikawa | G06T 1/20 | 358/518 |
| 2007/0150718 A1* | 6/2007 | Toi | G06F 1/3218 | 713/100 |
| 2008/0155074 A1* | 6/2008 | Bacinschi | G06F 9/44505 | 709/222 |
| 2008/0232439 A1* | 9/2008 | Chen | H04L 25/03038 | 375/148 |
| 2009/0287489 A1* | 11/2009 | Savant | G10L 15/07 | 704/246 |
| 2010/0225948 A1* | 9/2010 | Sato | H04N 1/00965 | 358/1.13 |
| 2010/0245878 A1* | 9/2010 | Yamada | H04N 1/0096 | 358/1.13 |
| 2010/0302335 A1* | 12/2010 | Imai | B41J 2/355 | 347/171 |
| 2010/0333080 A1* | 12/2010 | Keys | G06F 8/68 | 717/171 |
| 2011/0038016 A1* | 2/2011 | Nakamura | H04N 1/00933 | 358/448 |
| 2011/0109931 A1* | 5/2011 | Nomura | H04N 1/0097 | 358/1.13 |
| 2011/0145408 A1* | 6/2011 | Olsson | H04L 41/5058 | 709/225 |
| 2011/0216247 A1* | 9/2011 | Nishida | H03K 19/17756 | 348/725 |
| 2011/0225415 A1* | 9/2011 | Yamada | H03K 19/17752 | 713/100 |
| 2011/0235078 A1* | 9/2011 | Hara | G06F 3/1211 | 358/1.13 |
| 2012/0105884 A1* | 5/2012 | Matsumura | G06F 9/445 | 358/1.13 |
| 2012/0300238 A1* | 11/2012 | Hara | G03G 15/5087 | 358/1.13 |
| 2012/0300255 A1* | 11/2012 | Hara | G06F 3/1211 | 358/1.15 |
| 2013/0208321 A1* | 8/2013 | Suzuki | G06K 15/1881 | 358/3.06 |
| 2014/0244981 A1* | 8/2014 | Okada | G06F 15/7867 | 712/220 |
| 2015/0256687 A1* | 9/2015 | Shinto | H04N 1/0083 | 358/1.15 |

* cited by examiner

FIG. 4

| | | COLOR COPY JOB | MONOCHROME COPY JOB |
|---|---|---|---|
| IMAGE PROCESSING UNIT A | DATA PROCESSING UNIT A | SCAN IMAGE PROCESSING CIRCUIT | |
| | PARAMETER HOLDING UNIT A | SCAN IMAGE PROCESSING PARAMETER HOLDING CIRCUIT | |
| IMAGE PROCESSING UNIT B | DATA PROCESSING UNIT B | COPY IMAGE PROCESSING CIRCUIT | |
| | PARAMETER HOLDING UNIT B | COLOR COPY IMAGE PROCESSING PARAMETERS | MONOCHROME COPY IMAGE PROCESSING PARAMETERS |
| IMAGE PROCESSING UNIT C | DATA PROCESSING UNIT C | PRINT IMAGE PROCESSING CIRCUIT | |
| | PARAMETER HOLDING UNIT C | COLOR PRINT IMAGE PROCESSING PARAMETERS | MONOCHROME PRINT IMAGE PROCESSING PARAMETERS |

FIG. 5A

| c6 | c5 | c4 | c5 | c6 |
|----|----|----|----|----|
| c7 | c2 | c1 | c2 | c7 |
| c8 | c3 | c0 | c3 | c8 |
| c7 | c2 | c1 | c2 | c7 |
| c6 | c5 | c4 | c5 | c6 |

FILTER COEFFICIENTS

FIG. 5B

| PARAMETER NAME | PARAMETER VALUE (COLOR SCAN) 501 | PARAMETER VALUE (MONOCHROME SCAN) 502 |
|---|---|---|
| c0 | 16 | 64 |
| c1 | 8 | 8 |
| c2 | 8 | 8 |
| c3 | 8 | 8 |
| c4 | 4 | 0 |
| c5 | 4 | 0 |
| c6 | 0 | 0 |
| c7 | 4 | 0 |
| c8 | 4 | 0 |

FILTER COEFFICIENT VALUES

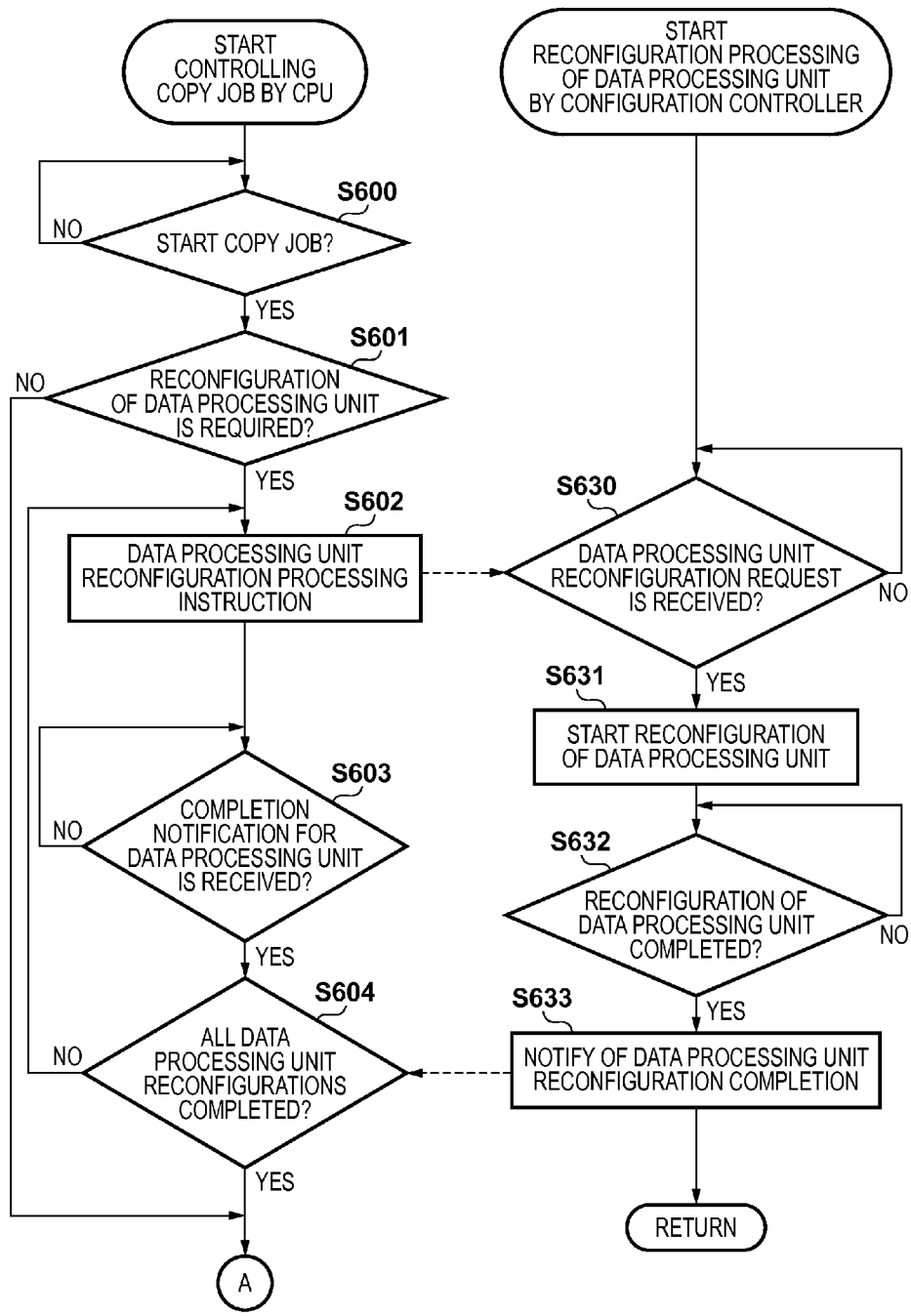

IMAGE PROCESSING APPARATUS, METHOD OF CONTROLLING THE SAME, NON-TRANSITORY COMPUTER READABLE STORAGE MEDIUM, AND DATA PROCESSING APPARATUS

BACKGROUND OF THE INVENTION

Field of the Invention

The present invention relates to an image processing apparatus, a method of controlling the same, a non-transitory computer readable storage medium, and a data processing apparatus.

Description of the Related Art

Reconfigurable circuits such as PLDs (Programmable Logic Devices) and FPGAs (Field Programmable Gate Arrays) for which an internal logical circuit configuration is modifiable are well known. In general, PLDs, FPGAs, or the like, are realized by switching functions of the internal logical block by writing logical circuit configuration information stored in a non-volatile memory such as a ROM upon activation to a configuration memory, which is an internal volatile memory. Also, because information within the configuration memory is cleared upon a power supply disconnection, it is necessary for reconfiguration to be performed by writing the logical circuit configuration information into the configuration memory once again upon power supply activation. An approach of performing a configuration of a hardware resource only once in this way is called "static reconfiguration". Meanwhile, circuits in which it is possible to modify a logical circuit configuration in operation have been developed, and the approach of modifying a logical circuit in operation is called "dynamic reconfiguration".

Also, in FPGAs, there are those for which it is possible to rewrite a specific region rather than the whole chip, and this kind of rewriting is called "partial reconfiguration". In particular, performing a partial reconfiguration in a state in which other in operation circuits are not stopped is called "dynamic partial reconfiguration". In the dynamic partial reconfiguration, by rewriting only a portion of the configuration memory region rather than rewriting the whole configuration memory upon the reconfiguration, it becomes possible to realize a partial reconfiguration of a logical block within the FPGA. By using this kind of dynamic partial reconfiguration technique, it becomes possible to implement a plurality of circuits in one region by switching, and thereby the function that is realized in a logical block in which multiplexing of hardware resources is performed can be modified. As a consequence, it becomes possible to flexibly realize various functions in accordance with the intended uses with less hardware resources while maintaining high computational capabilities with the hardware.

However the logical circuit configuration information, while it is possible to modify the circuit configuration in operation, the time required for modification (rewriting) of the circuit configuration is long, and the time is proportional to the size of the logical circuit configuration information written to the configuration memory. For this reason, conventionally, techniques for reducing the circuit configuration rewrite time have been proposed. As a conventional technique for reducing a rewrite time there is an approach in which, in pipeline architecture processing, reconfiguration on a reconfigurable circuit is performed in order from a leading portion circuit in the pipeline, and activation is performed in order in which the portion circuits are reconfigured (for example, refer to Japanese Patent Laid-Open No. 2011-186981). With this, it is possible to increase data processing speeds more than in an approach of activating having collectively reconfigured reconfigurable circuits simultaneously on a reconfigurable circuit. Also, an approach of holding a plurality of circuits in order to realize predetermined functions and selecting from these in accordance with an operational state is disclosed (for example, refer to Japanese Patent Laid-Open No. 2007-179358).

Meanwhile, an image processing apparatus such as an MFP (Multi Function Peripheral) is capable of selecting a plurality of processes (a color copy job, a monochrome copy job, a print job, a SEND job, or the like) in accordance with a request from a user. Image processing in accordance with these processes is realized by hardware or by software. In general, a logical circuit comprised in hardware is comprised of processing circuits and parameter holding circuits in order to increase versatility, and by modifying parameter coefficients set in the parameter holding circuit, operation and processing details that are necessary in accordance with intended use are realized. Also, it is often the case that setting of parameter coefficients is performed by a CPU.

According to the approach shown in Japanese Patent Laid-Open No. 2011-186981, an order of reconfiguration is controlled in accordance with an order of an image processing unit of a pipeline architecture. However, in a case where a system using a dynamic partial reconfiguration technique for an image processing unit is configured in an image processing apparatus, it is necessary to perform parameter settings after rewriting the circuit configuration of the image processing unit. For this reason, there is a problem in that in addition to the partial reconfiguration time each time the processing is switched, it takes time to set the parameters.

Also, for the approach shown in Japanese Patent Laid-Open No. 2007-179358, there is a problem in that for reconfiguration of a selected logical circuit, in a case where the logical circuit is of a large scale, or in a case where there are many logical circuits that are reconfigured, it takes a long time to perform the reconfiguration.

The present invention, in view of these kinds of problems, makes a start of subsequent processing be earlier when, in an image processing apparatus capable of dynamic partial reconfiguration, processing is switched by modifying parameters.

SUMMARY OF THE INVENTION

According to one aspect of the present invention, there is provided an image processing apparatus, comprising: a dynamic portion reconfiguration unit configured to be able to reconfigure an internal circuit configuration dynamically and partially; and a reconfiguration control unit configured to control the reconfiguration of the circuit configuration by the dynamic portion reconfiguration unit; wherein one or more processing circuits configured in the dynamic portion reconfiguration unit are each configured to include a data processing unit and a parameter holding unit for holding a parameter used for processing by the data processing unit, and for the parameter holding unit, a circuit configuration corresponding to a parameter corresponding to a setting in the processing by the data processing unit is defined, and the reconfiguration control unit, in accordance with a modification of the setting in the processing by the data processing unit, reconfigures only the circuit configuration of the parameter holding unit.

According to another aspect of the present invention, there is provided a method of controlling an image processing apparatus comprising a dynamic portion reconfiguration unit configured to be able to reconfigure an internal circuit configuration dynamically and partially, the method comprising: a reconfiguration step of controlling the reconfiguration of the circuit configuration by the dynamic portion reconfiguration unit, wherein one or more processing circuits configured in the dynamic portion reconfiguration unit are each configured to include a data processing unit and a parameter holding unit for holding a parameter used for processing by the data processing unit, and for the parameter holding unit, a circuit configuration corresponding to a parameter corresponding to a setting in the processing by the data processing unit is defined, and in the reconfiguration control step, in accordance with a modification of a setting in the processing by the data processing unit, reconfigures only the circuit configuration of the parameter holding unit.

According to one aspect of the present invention, there is provided a non-transitory computer-readable medium storing a program for causing a computer comprising a dynamic portion reconfiguration unit configured to be able to reconfigure an internal circuit configuration dynamically and partially to function as a reconfiguration control unit for controlling the reconfiguration of the circuit configuration by the dynamic portion reconfiguration unit, wherein one or more processing circuits configured in the dynamic portion reconfiguration unit are each configured to include a data processing unit and a parameter holding unit for holding a parameter used for processing by the data processing unit, and for the parameter holding unit, a circuit configuration corresponding to a parameter corresponding to a setting in the processing by the data processing unit is defined, and the reconfiguration control unit, in accordance with a modification of a setting in the processing by the data processing unit, reconfigures only the circuit configuration of the parameter holding unit.

According to one aspect of the present invention, there is provided a data processing apparatus comprising: a dynamically reconfigurable circuit in which a logical circuit configured to function as a data processing circuit for processing data and a logical circuit configured to function as a first parameter holding circuit for holding, as a specific value, a first parameter that is used in processing by the data processing circuit, and that corresponds to a setting of that processing are configured; and a configuration unit configured to, based on a modification of a setting of the processing by the data processing circuit, configure a logical circuit configured to function as a second parameter holding circuit for holding, as a specific value, a second parameter corresponding to a setting after the modification, in the dynamically reconfigurable circuit so as to be used in the processing by the data processing circuit after the modification of the setting.

By virtue of the present invention, it becomes possible to reduce the time taken for a parameter setting and to make earlier a start of subsequent processing in an image processing apparatus capable of dynamic partial reconfiguration.

Further features of the present invention will become apparent from the following description of exemplary embodiments (with reference to the attached drawings).

BRIEF DESCRIPTION OF THE DRAWINGS

FIG. 4 is a view for showing an example of functions and image processing that is performed in an image processing apparatus according to the present embodiment.

FIGS. 5A and 5B are views for showing parameter values for image processing according to the present embodiment.

FIG. 6 is a flowchart for showing CPU control in a copy job and reconfiguration control of a data processing unit according to the present embodiment.

DESCRIPTION OF THE EMBODIMENTS

Hereinafter, embodiments for working the present invention are explained using drawings.

[Image Processing Apparatus Configuration]

Figure 1:
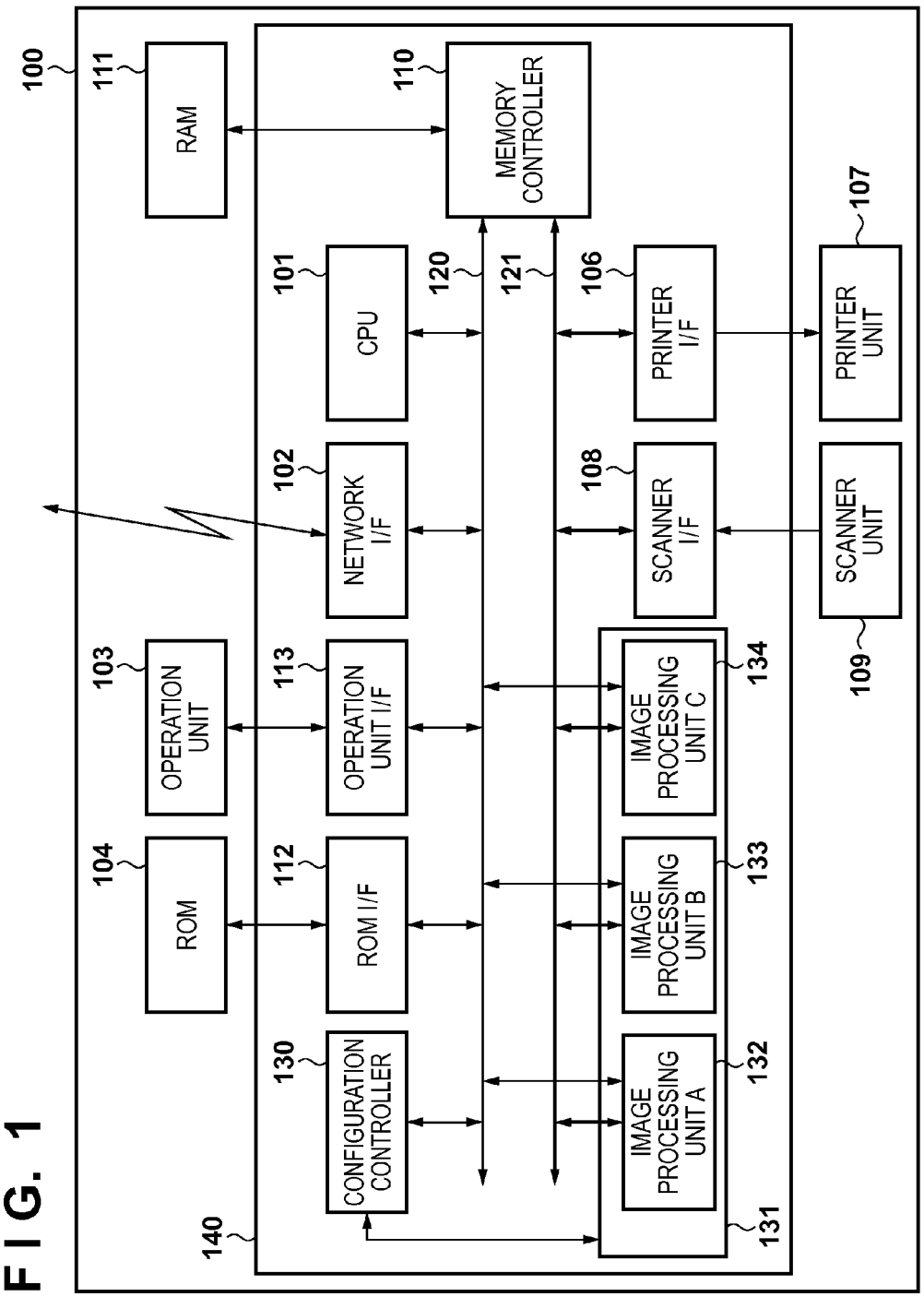
FIG. 1 is a view for illustrating an example of a configuration of an image processing apparatus according to the present embodiment.

FIG. 1 is a view for explaining an example configuration of the image processing apparatus according to embodiments of the present invention. An image processing apparatus 100 of the present embodiment comprises an operation unit 103, a scanner unit 109, and a printer unit 107. The operation unit 103 is a user interface for a user using the image processing apparatus 100 to perform various operations. The scanner unit 109 scans image information in accordance with an instruction from the operation unit 103. The scanner unit 109 comprises a CPU (not shown) for controlling the scanner unit 109, an illumination lamp (not shown) or a scanning mirror (not shown) for performing an original scanning, or the like. The printer unit 107 prints image data onto a sheet. The printer unit 107 comprises the CPU (not shown) for performing control of the printer unit 107, a photosensitive drum (not shown), a fixing unit (not shown) for performing image formation or fixing, or the like.

Also, the image processing apparatus 100 comprises an FPGA 140 functioning as a controller for performing control of the image processing apparatus 100. In the example shown in FIG. 1, the FPGA 140 is equipped with the CPU 101 which comprehensively controls operation of the image processing apparatus 100. The CPU 101 executes control software for controlling each unit in the image processing apparatus 100, such as the FPGA 140 and a configuration controller 130 which controls reconfiguration. Note, the FPGA 140 being provided with the CPU 101 is merely an example, and the CPU may be arranged outside of the FPGA 140.

The image processing apparatus 100 comprises a ROM 104 and a RAM 111 which function as storage units. A boot program to be executed by the CPU 101 and logical circuit configuration information (configuration data) for configuring the FPGA 140 are stored in the ROM 104. The RAM 111 serves as a system work memory for operation of the CPU 101, an image memory for temporarily storing image data, and a memory for storing and reading out a copy of a logical circuit configuration information stored in the ROM 104 at high speed, for example.

The FPGA 140 comprises a dynamic portion reconfiguration unit 131 and the configuration controller 130 for controlling a circuit configuration (configuration) of the dynamic portion reconfiguration unit 131. The dynamic portion reconfiguration unit 131 is dynamically rewritable and partially rewritable. That is, while a part of the circuit of the dynamic portion reconfiguration unit 131 is operating, another circuit can be reconfigured in different part which does not overlap with the part covered by that circuit. The dynamic portion reconfiguration unit 131 comprises an image processing unit A 132, an image processing unit B 133, and an image processing unit C 134 whose logical circuits for performing various image processing can be reconfigured partially.

Note, in the present embodiment, explanation is given with an example in which the number of the image processing units configured in the dynamic portion reconfiguration unit 131 is three, but the number of the image processing units is not limited to three, and for example, more image processing units may be equipped. Also, the FPGA 140 comprises a scanner I/F 108 for inputting image data from the scanner unit 109, and a printer I/F 106 for outputting image data to the printer unit 107. The image processing unit A 132, the image processing unit B 133, the image processing unit C 134, the scanner I/F 108, and the printer I/F 106 of the dynamic portion reconfiguration unit 131 are connected to an image bus 121 for transferring processed image data respectively.

Also, the FPGA 140 is connected to a network (not shown) via a network I/F 102, and performs communication (data transmission/reception) with a general-purpose computer (not shown) on a network. Also, the FPGA 140 comprises a ROM I/F 112. The ROM I/F 112 controls writing and readout operations with respect to the ROM 104. In the FPGA 140, the CPU 101, the network I/F 102, the operation unit I/F 113, the ROM I/F 112, the configuration controller 130, and the dynamic portion reconfiguration unit 131 are connected with each other via a system bus 120.

The CPU 101 performs parameter settings for each image processing unit (the image processing units A 132, B 133 and C 134) configured in the dynamic portion reconfiguration unit 131, the scanner I/F 108, and the printer I/F 106, via the system bus 120. Furthermore, the FPGA 140 comprises a memory controller 110. The memory controller 110 controls the write and readout operation to the RAM 111. The memory controller 110 is connected to the system bus 120 and the image bus 121. The memory controller 110 exclusively switches between an access from a bus master connected to the image bus 121 to the RAM 111, and an access from a bus master connected to the system bus 120 to the RAM 111.

[Image Processing Circuit Example Configuration]

Next, an example of a reconfiguration of the image processing capabilities configured in the dynamic portion reconfiguration unit 131 in accordance with the image processing apparatus of the present embodiment is explained using FIG. 2 to FIG. 5B.

Figure 2:
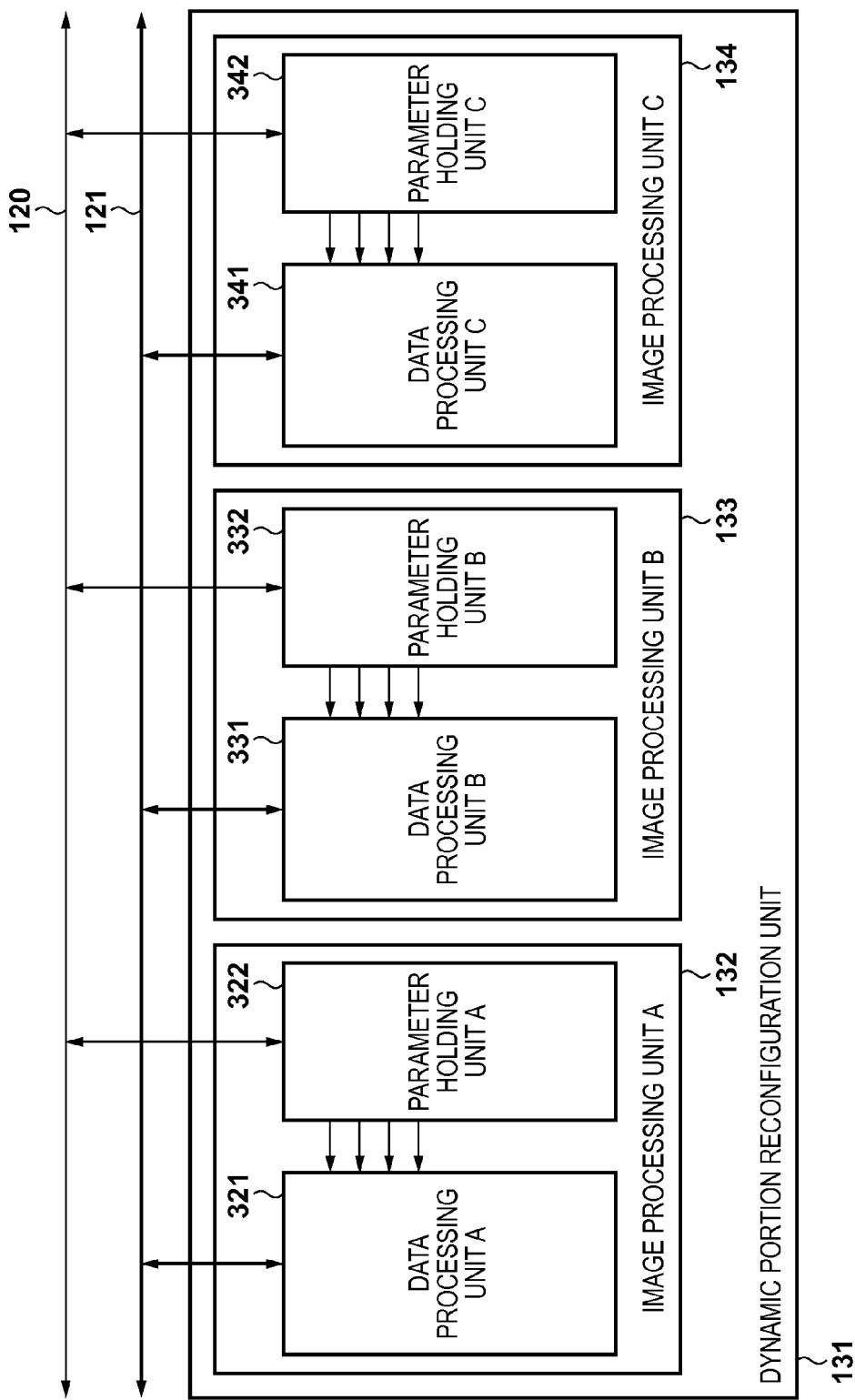
FIG. 2 is a view for showing a logical circuit configuration of an image processing unit configured in a dynamic portion reconfiguration unit according to the present embodiment.

FIG. 2 is for illustrating a logical circuit configuration of the image processing units which are reconfigurable and are included in the dynamic portion reconfiguration unit 131. The image processing unit A 132 is comprised of a data processing unit A 321 and a parameter holding unit A 322. The data processing unit A 321 is connected to the image bus 121, and performs the image processing corresponding to the image data. The parameter holding unit A 322 is connected to the system bus 120, and holds parameter coefficients which are set by the CPU 101 and determines an operation or processing content of the data processing unit A 321. The parameter holding unit A 322 is configured such that parameter values indicating the operation and the processing details of the data processing unit A 321 held internally are passed to the data processing unit A 321. Also, the same configuration as that of the image processing unit A 132 is taken for the image processing unit B 133 and the image processing unit C 134.

Figure 3:
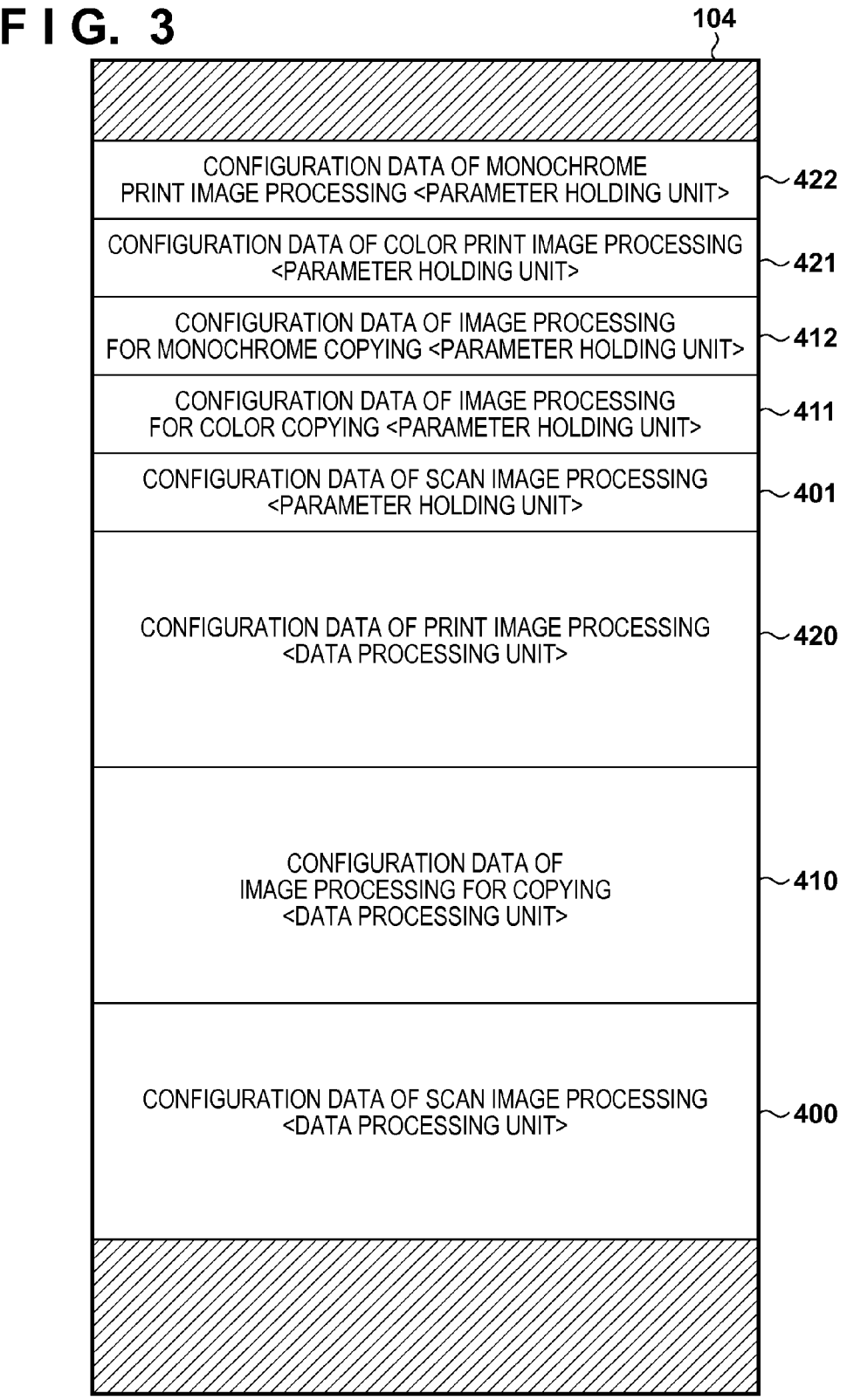
FIG. 3 is a view for illustrating an example configuration of configuration data according to the present embodiment.

FIG. 3 is for illustrating the configuration data defined in accordance with each image processing capability stored in the ROM 104. Because each image processing capability is realized by two logical circuits (a data processing unit and a parameter holding unit), configuration data corresponding to each logical circuit is prepared.

Configuration data 400, 410, 420 is data processing unit configuration data corresponding to scan image processing, image processing for copying, and print image processing respectively. Also, configuration data 401, 411, 412, 421, 422 is parameter holding unit configuration data corresponding to scan image processing, image processing for copying (color/monochrome), and print image processing (color/monochrome) respectively.

With regards to values for which parameter values are common and fixed for each job and processing function, the parameter holding unit has a configuration for holding fixed value parameters for each job and processing function rather than a configuration in which these are set by the CPU 101. However, with regards to the scanner unit 109 or the printer unit 107, fluctuation of a scan image or a print image is caused by in operation usage conditions such as temperature conditions or device aging changes such as an LED light intensity fluctuation. Therefore, this may be handled by modifying the parameter values in response to the situation in which the device is operating. With regards to image processing units matching these kinds of device characteristics, conventional parameter holding units that are settable by the CPU 101 are configured.

FIG. 4 is a table for explaining the contents configured in the data processing units and the parameter holding units of the image processing units A 132, B 133 and C 134, upon the execution of a color copy job and a monochrome copy job that the image processing apparatus is capable of executing.

Table conversion processing which corrects a fluctuation of a scanner image caused by device characteristics of the scanner unit 109, or the like, is given as a function of the image processing unit A 132. Similarly, image processing for copying such as filter processing or color conversion processing which converts from RGB data to CMYK data is given for a function of the image processing unit B 133. Similarly, halftoning processing for performing conversion into N values by comparing input image data and a predetermined threshold is given as a function of the image processing unit C 134. It becomes possible to obtain optimal processing results for each job by modifying the parameter values for these image processing units for example for each job (color copy, monochrome copy, or the like).

In case of the copy job, it is performed by processing the image processing units A 132, B 133 and C 134 consecutively. Note that explanation is given with the examples of color copy and monochrome copy in the present embodiment, but jobs that the image processing apparatus 100 can process are not limited to this. Also, regarding the units of the image processing, limitation is not made to what is shown in FIG. 4, and configuration may be taken for dividing the processing included in each image process into finer granularity.

In the present embodiment, explanation will be given with an example of a case in which, for the scan image processing of the image processing unit A 132, parameter setting is performed by the CPU 101, and for the image processing unit B 133 and the image processing unit C 134, the parameter values are fixed by the job.

FIGS. 5A and 5B are for showing parameter values and coefficients for filtering processing in the copy job. In the present embodiment, explanation will be given with an example of a 5×5 matrix filter. The matrix filter shown in FIG. 5A holds 9 coefficients (c0-c8), and these are arranged as illustrated in FIG. 5A. Here, it is assumed that the coefficient c0 is a coefficient corresponding to a pixel of interest, and a convolution operation is performed on the coefficient values shown in FIG. 5A for the pixel values of the 24 pixels centered around the pixel of interest. Also, FIG. 5B is for illustrating each coefficient value in the color copy job and the monochrome copy job. In the present embodiment, filtering processing is performed using the filter coefficients shown in the parameter values 501 upon a color scan, and filtering processing is performed using the filter coefficients shown in the parameter values 502 upon a monochrome scan. In such a case, a circuit configured in the parameter holding unit B 332 need not comprise a circuit for performing parameter setting from the CPU 101 or a logical circuit for holding parameter values set from the CPU 101. In other words, the circuit comprised in the parameter holding unit B 332 may be a logical circuit for outputting only filter coefficient values (c0-c8) as fixed values as shown in FIG. 5B.

[Reconfiguration Control Flow]

Figure 7:
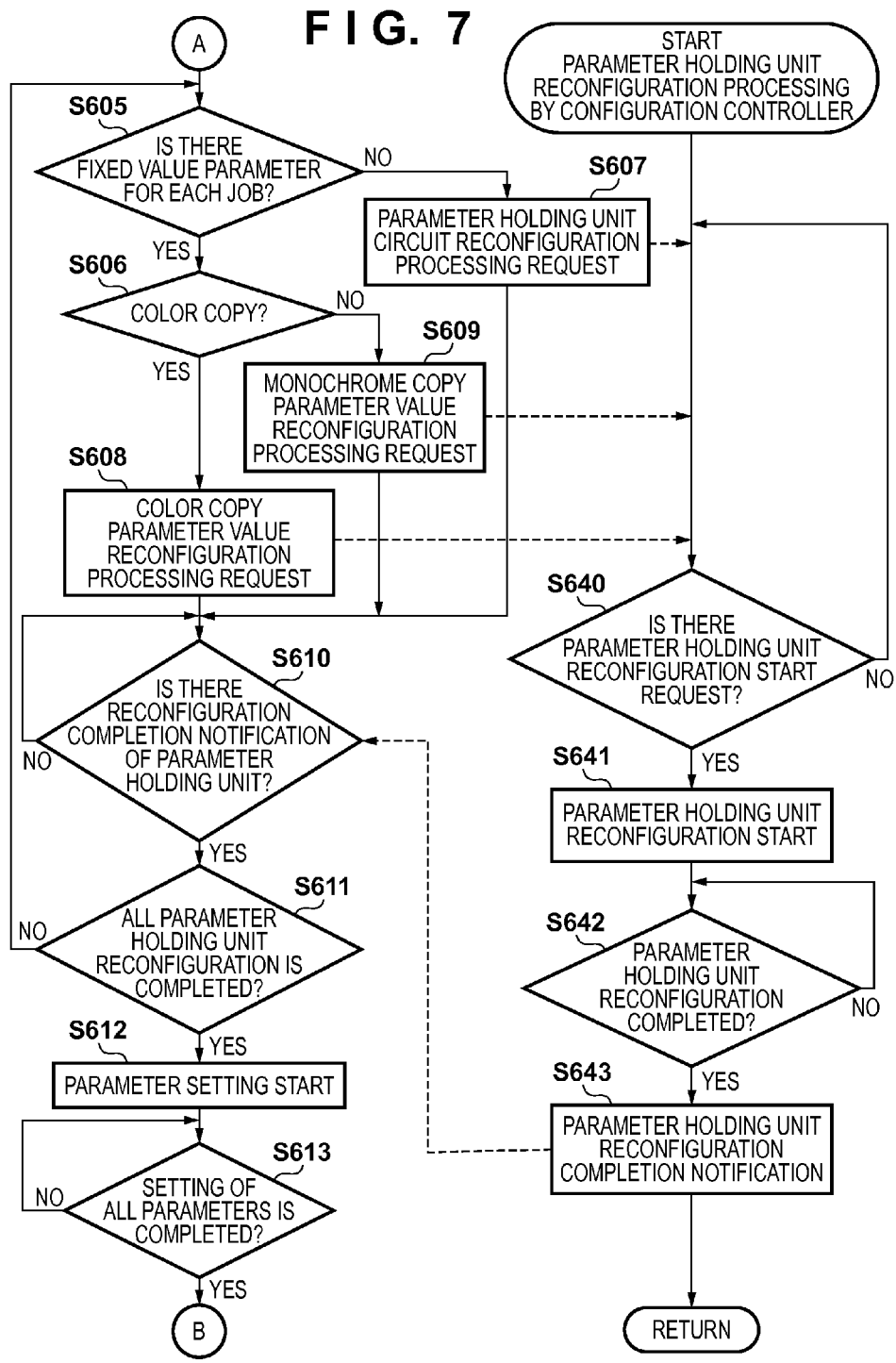
FIG. 7 is a flowchart for showing CPU control in a copy job and reconfiguration control of a parameter holding unit according to the present embodiment.
Figure 8:
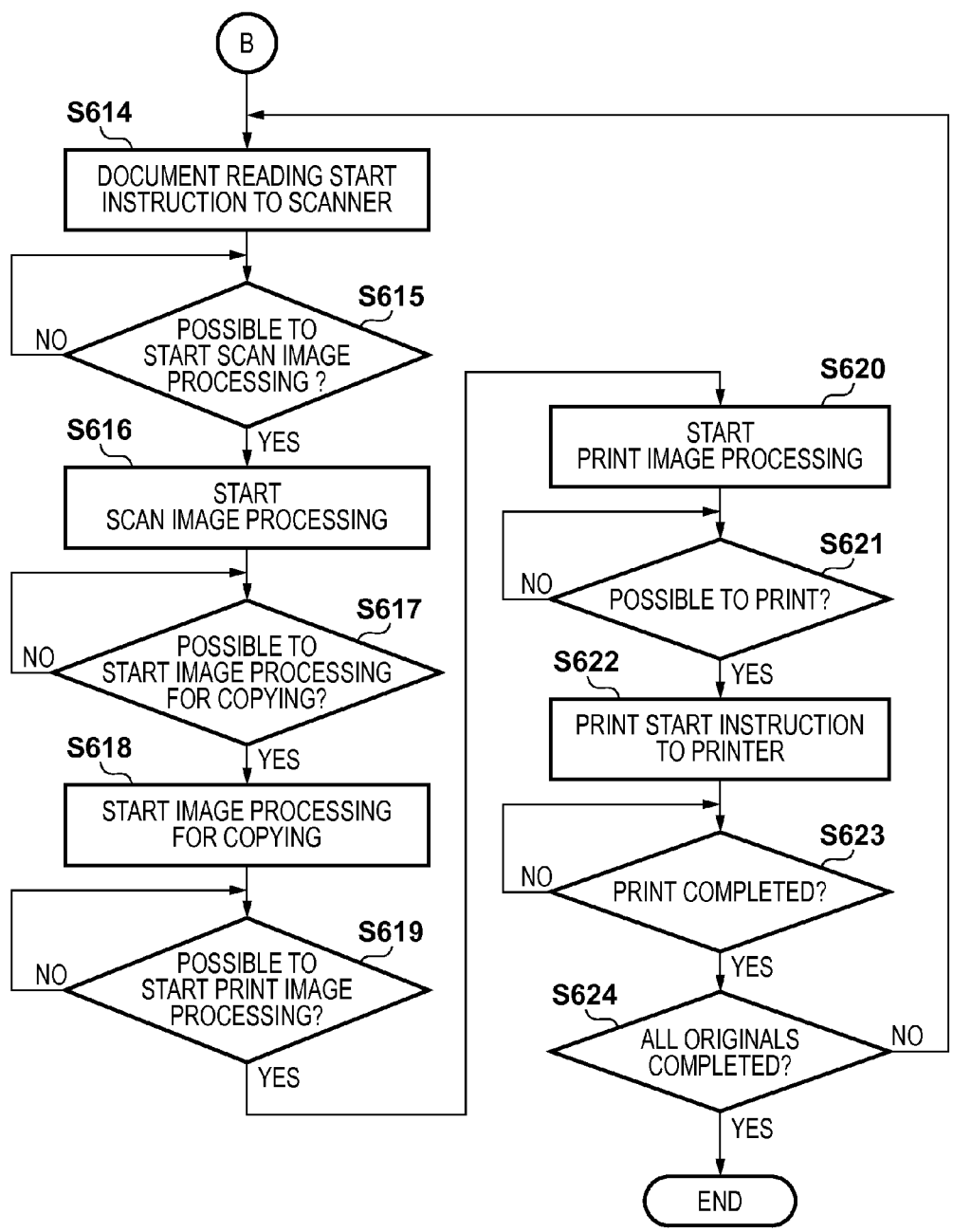
FIG. 8 is a flowchart for showing CPU control for image processing in a copy job according to the present embodiment.

An example of a procedure for reconfiguration of the dynamic portion reconfiguration unit 131 of the image processing apparatus according to the present embodiment is shown in the flowcharts of FIG. 6-FIG. 8. Note, this flowchart is for a copy job, and each step of the procedure is executed by the CPU 101.

Accordingly, in a case where the type of the job is different, the flow shown below would be modified in accordance with the type of that job. Also, in the present embodiment, as described above, the parameter holding unit of the scan image processing configured in the image processing unit A 132 is configured so as to perform parameter setting by the CPU 101. Meanwhile, the parameter holding units for the image processing for copying and the print image processing configured in the image processing units B 133 and C 134 are configured so as to hold fixed value parameters. Note, in FIG. 6-FIG. 8, the broken lines indicate transmission/reception of data between the processing subjects.

Firstly, using FIG. 6, explanation will be given for a flow upon a copy job up until completion of reconfiguration of the data processing units A 321, B 331 and C 341. In step S600, the CPU 101 determines whether or not there is a copy job execution request from the operation unit 103, and in a case where a copy job request is received (YES in step S600), the processing proceeds to step S601. In step S601, the CPU 101 determines whether or not reconfiguration of the data processing unit of the logical circuit comprising the image processing capabilities necessary for the copy job is necessary. In a case where, prior to the copy job in the present embodiment, the copy job is already being executed, the logical circuit for the copy job is already configured in the data processing units A 321, B 331 and C 341, and the reconfiguration is determined to be unnecessary (NO in step S601). In such a case, the CPU 101 completes the data processing unit reconfiguration processing, and the processing proceeds to step S605 shown in FIG. 7. Meanwhile, in a case where a logical circuit for a copy job is not configured in the data processing units A, B and C (YES in step S601), the processing proceeds to step S602.

In step S602, the CPU 101, in order to perform the reconfiguration of the data processing unit of the logical circuit comprising the image processing capability necessary for the copy job, requests information of the configuration data 400 of the data processing unit A 321 and makes a notification to the configuration controller 130. Due to this notification, the data processing unit reconfiguration processing by the configuration controller 130 is started.

In step S630, the configuration controller 130 waits until there is a data processing unit reconfiguration request from the CPU 101 (step S602), and when a reconfiguration request corresponding to the data processing unit is received (YES in step S630), the processing proceeds to step S631. In step S631, the configuration controller 130, in accordance with the notification from the CPU 101, reads out the configuration data 400 of the data processing unit A for the scan image processing stored in the ROM 104, and performs a write to the data processing unit A 321.

In step S632, the configuration controller 130 waits until the reconfiguration of the data processing unit A 321 completes, and when it does complete (YES in step S632), the processing proceeds to step S633. In step S633, the configuration controller 130 makes a notification to the CPU 101 that the reconfiguration of the data processing unit has completed. With this, the processing for the reconfiguration of the data processing unit on the configuration controller 130 side completes.

In the step S603, the CPU 101 determines whether or not it received the notification of completion of the reconfiguration from the configuration controller 130. If it waits until the reconfiguration completion notification is made, and receives the reconfiguration completion notification (YES in the step S603), the processing proceeds to step S604. In step S604, the CPU 101 determines whether all data processing unit reconfigurations have completed. In a case where all of the reconfigurations have yet to be completed (NO in step S604), the processing proceeds to step S602, and the reconfiguration of the data processing unit is repeated. In a case where all of the reconfigurations have completed (YES in step S604), the processing proceeds to step S605 which is shown in the flowchart of FIG. 7.

In the present example, after the reconfiguration of the data processing unit A 321, in order to perform the reconfigurations of the data processing unit B 331 and the data processing unit C 341, the CPU 101 and the configuration controller 130 repeat the processing of step S602-step S604 and step S630-step S633. In such a case, a reconfiguration is performed using the configuration data 410 for the data processing unit B 331 in order to perform the image processing for copying and the configuration data 420 from the data processing unit C 341 in order to perform the print image processing stored in the ROM 104.

Next, using FIG. 7, explanation will be given for a flow upon the copy job up until reconfiguration completion of the parameter holding units A 322, B 332 and C 342. In step S605, the CPU 101 determines whether or not the parameter value held in the parameter holding unit is something that is fixed (fixed value) for each type of job. In a case where the parameter values are not fixed values for each job, and rather setting to the parameter holding unit by the CPU 101 is necessary (NO in step S605), the processing proceeds to step S607. Meanwhile, in a case where the parameter values are fixed according to the type of the job (YES in step S605), the processing proceeds to step S606.

In step S606, the CPU 101 determines whether the copy job is a color copy job or a monochrome copy job. In the case of the color copy job (YES in step S606), the processing proceeds to step S608, and in the case of the monochrome copy job (NO in step S606), the processing proceeds to step S609.

In step S607, the CPU 101 configures the logical circuit of the parameter holding unit for the scan image processing in the parameter holding unit A 322. Here, the CPU 101 requests the information of the configuration data 401 of the parameter holding unit stored in the ROM 104 and also makes a notification to the configuration controller 130. Due to this notification, the reconfiguration processing of the parameter holding unit by the configuration controller 130 is started.

In step S608, the CPU 101 configures the parameter holding unit for holding the parameter values for the image processing for a color copy in the parameter holding units B 332 and C 342. Here, the CPU 101 requests the information of the configuration data 411 and 421 stored in the ROM 104 and also makes a notification to the configuration controller 130. Due to this notification, the parameter holding unit reconfiguration by the configuration controller 130 is started.

In step S609, the CPU 101 configures the parameter holding unit for holding the parameter values for the image processing for a monochrome copy in the parameter holding units B 332 and C 342. Here, the CPU 101 requests the information of the configuration data 412 and 422 stored in the ROM 104 and also makes a notification to the configuration controller 130. Due to this notification, the parameter holding unit reconfiguration by the configuration controller 130 is started.

In step S640, the configuration controller 130 waits until there is a parameter holding unit reconfiguration request from the CPU 101 (step S607-step S609), and when a reconfiguration request corresponding to a parameter holding unit is received (YES in step S640), the processing proceeds to step S641. In step S641, the configuration controller 130, in accordance with the notification from the CPU 101, reads out configuration data of the parameter holding unit stored in the ROM 104 (reference numerals 401, 411, 412, 421, and 422), and performs writing to the parameter holding unit.

In step S642, the configuration controller 130 waits until the reconfiguration of the parameter holding unit completes, and when it does complete (YES in step S642), the processing proceeds to step S643. In step S643, the configuration controller 130 makes a notification to the CPU 101 that the parameter holding unit reconfiguration has completed.

In the step S610, the CPU 101 determines whether or not it received the notification of completion of the reconfiguration from the configuration controller 130. If it waits until the reconfiguration completion notification is made, and receives the reconfiguration completion notification (YES in the step S610), the processing proceeds to step S611. In step S611, the CPU 101 determines whether the reconfigurations corresponding to all the parameter holding units have completed. In a case where the reconfigurations of all of the parameter holding units have yet to be completed (NO in step S611), the processing proceeds to step S605, and the reconfiguration is repeated. In a case where all of the reconfiguration have been completed (YES in step S611), the processing proceeds to step S612.

In step S612, the CPU 101 completes the reconfiguration, and starts a setting of parameter values in accordance with the job for the parameter holding units for which the parameter setting is necessary. In step S613, the CPU 101 determines whether or not all of the parameter value settings have been completed for the parameter holding units for which parameter setting is necessary. In a case where the parameter setting value setting has yet to be completed (NO in step S613), it waits, and in a case were the parameter setting has been completed (YES in step S613), the processing proceeds to step S614 which is shown in the flowchart of FIG. 8.

Next, using FIG. 8, explanation will be given for a flow for a copy operation upon the copy job. In step S614, the CPU 101 makes an instruction to start reading an original to the scanner unit 109. An original image read in by the scanner unit 109 is fed from the scanner I/F 108, and stored in the RAM 111 via the image bus 121 and the memory controller 110.

In step S615, the CPU 101 determines whether or not the image data fed in step S614 is not less than a predetermined amount necessary in order to perform the scan image processing configured in the image processing unit A 132. In a case where the amount of image data necessary to perform the scan image processing is fed (YES in step S615), the processing proceeds to step S616. In step S616, the CPU 101 makes an instruction to start the scan image processing to the image processing unit A 132. The image processing unit A 132, in accordance with the instruction of the CPU 101, reads out image data stored in the RAM 111, and performs the scan image processing using the parameter values of the parameter holding unit A 322. After this, the image processing unit A 132 stores post image processing image data in the RAM 111.

In step S617, the CPU 101 determines whether or not the predetermined amount of data necessary to perform the image processing for copying configured in the image processing unit B 133 exists for the image data processed by the image processing unit A 132 in step S616. In a case where the amount of image data necessary to perform the image processing for copying does exist (YES in step S617), the processing proceeds to step S618. In step S618, the CPU 101 makes an instruction to start the image processing for copying to the image processing unit B 133. The image processing unit B 133, in accordance with the instruction of the CPU 101, reads out image data stored in the RAM 111, and performs the image processing for copying using the parameter values of the parameter holding unit B 332. After this, the image processing unit B 133 stores post image processing image data in the RAM 111.

In step S619, the CPU 101 determines whether or not the predetermined amount of data necessary to perform the print image processing configured in the image processing unit C 134 exists regarding the image data processed by the image processing unit B 133 in step S618. In a case where the amount of image data necessary to perform the print image processing does exist (YES in step S619), the processing proceeds to step S620. In step S620, the CPU 101 makes an instruction to start the print image processing to the image processing unit C 134. The image processing unit C 134, in accordance with the instruction of the CPU 101, reads out image data stored in the RAM 111, and performs the print image processing using the parameter values of the parameter holding unit C 342. After this, the image processing unit C 134 stores post image processing image data in the RAM 111.

In step S621, the CPU 101 determines whether or not the predetermined amount of data necessary to start the print exists in the printer unit 107 for the image data processed by the image processing unit C 134 in step S620, and the printer unit 107 is in a state in which it can print. In a case where the printer unit 107 can print (YES in step S621), the processing proceeds to step S622.

In step S622, the CPU 101 makes a print start instruction to the printer I/F 106 and the printer unit 107, starting the transferring of image data stored in the RAM 111. In step S623, the CPU 101 determines whether or not the print by the printer unit 107 has completed. If the printing has completed (YES in step S623), the processing proceeds to step S624. In step S624, the CPU 101 determines whether or not all of the originals read in by the scanner unit 109 have been completed. Next, in a case where there is an original to be copied (NO in step S624), the processing returns to step S614, and the copy processing is repeated. In a case where the copy processing for all of the originals has been completed (YES in step S624), this processing flow is complete.

Above, in a case of performing a reconfiguration on the parameter holding units B 332 and C 342 of the dynamic portion reconfiguration unit 131, the parameter holding unit reconfiguration is performed using the configuration data corresponding to the selected job and function. Here, a plurality of items of configuration data holding fixed parameter values for each job or function is held as a configuration of the parameter holding unit. By this configuration, it becomes possible to speed up a start of image processing because parameter setting by the CPU 101 is unnecessary. This is explained with reference to FIG. 9.

[Processing Time Comparison Explanation]

Figure 9:
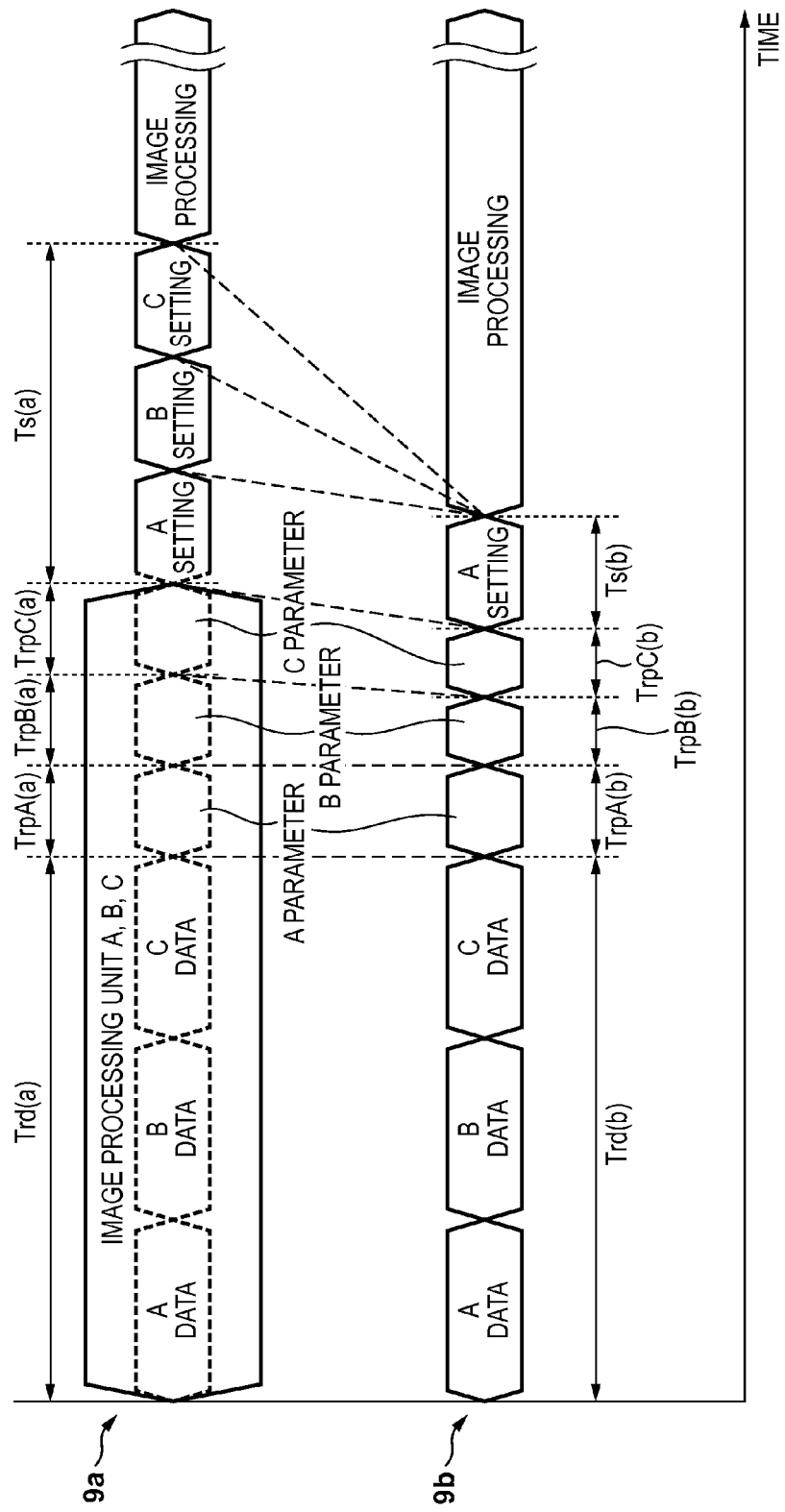
FIG. 9 is a time chart for showing a concept of temporal transitioning for reconfiguration and parameter setting of an image processing unit according to the present embodiment.

FIG. 9 is a time chart for representing states of the dynamic portion reconfiguration unit 131, and a concept of a temporal transitioning of parameter settings for the image processing units A, B and C by the CPU 101. In FIG. 9, the passing of time is shown in the abscissa axis. A reference number 9a indicates a time chart for a case in which parameter setting is performed by the CPU 101 after a reconfiguration in a conventional image processing unit. A reference number 9b indicates a time chart for an approach of reconfiguration using a parameter holding unit in which the parameter values are made to be fixed according to the present embodiment.

As illustrated by the reference number 9a, in the conventional approach the reconfiguration of the image processing units A, B and C of the dynamic portion reconfiguration unit 131 is performed first of all. The time required for this reconfiguration is substantially proportional to the scale of the circuits of the image processing units A, B and C; in other words, it is substantially proportional to the amount of data of the circuit information in the image processing units A, B and C. When all of the reconfigurations of the image processing units A, B and C have completed, parameter setting for the image processing units A, B and C is performed. After that, the image processing is started.

Here, Trd (a) is the time that it takes for the reconfigurations for the data processing units A 321, B 331 and C 341 of the image processing units A 132, B 133 and C 134. Also, the times it takes for the reconfigurations of the parameter holding units A 322, B 332 and C 342 are TrpA (a), TrpB (a), and TrpC (a) respectively. Also, the time it takes for the parameter setting of the image processing units A 132, B 133 and C 134 is Ts (a). In this case, in the conventional approach, the time required until the image processing is started is Trd (a)+TrpA (a)+TrpB (a)+TrpC (a)+Ts (a).

Meanwhile, in the approach of the present embodiment, as shown by the reference number 9b, first of all, the reconfigurations of the data processing units is performed. The time that it takes for the reconfigurations of the data processing units is Trd (b). The time that it takes for Trd (b) is the same as for Trd (a) described above. Next, in the reconfigurations of the parameter holding units, the times that it takes for each of the parameter holding units A 322, B 332 and C 342 are TrpA (b), TrpB (b), and TrpC (b) respectively. In the present embodiment, because, for the parameter holding unit A, the circuit for performing the parameter setting is reconfigured by the CPU 101, the time that it takes for the reconfiguration of the parameter holding unit A of the reference number 9a for TrpA (b) is the same as for TrpA (a). Regarding the parameter holding units B and C, the circuit configuration is such that the parameter values are already held, rather than being a configuration for which the parameter setting is performed by the CPU 101. For this reason, the interface circuits for setting from the CPU 101 and the circuits for holding the setting values are not necessary, and the circuit configuration is such that it only holds the fixed values. As a consequence, the amount of data of the configured circuits becomes less. As mentioned previously, the time required for the reconfiguration is substantially proportional to the amount of data for the scale of the circuit (the circuit information). Accordingly, the times that it takes for the reconfigurations (TrpB (b) and TrpC (b)) are smaller than TrpB (a) and TrpC (a) respectively (TrpB (b)<TrpB (a) and TrpC (b)<TrpC (a)).

Also, the time that it takes for the parameter setting by the CPU 101 in the present embodiment is Ts (b). Regarding the parameter holding units B 332 and C 342, because circuits for which the parameter values are already held are configured in the parameter holding units, there is no need for parameter setting by the CPU 101. For this reason, the time that it takes for Ts (b) is only the time relating to the parameter holding unit A 322, and the parameter setting can be completed in a short time compared to Ts (a) of the reference number 9a (Ts (b)<Ts (a)). As a consequence, it becomes possible to start the image processing earlier compared to the conventional approach.

In the present embodiment, explanation was given having an example of a flow for performing the reconfiguration of the parameter holding units after the reconfiguration of the data processing units of the image processing units A, B and C has completed, and performing the parameter setting after the reconfiguration of all of the circuits has completed. However, the order of the reconfiguration of the data processing units and the parameter holding units is not limited to this. Also, regarding the parameter settings by the CPU 101, configuration may be taken so as to start at the point in time when the reconfiguration of the target parameter holding units has completed.

By virtue of the present application invention, it becomes possible to reduce the time for parameter setting by a CPU, and to make earlier a start of image processing in an image processing apparatus comprising a dynamic portion reconfiguration unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-022781, filed Feb. 7, 2014, which is hereby incorporated by reference herein in its entirety.

What is claimed is:

1. A data processing apparatus comprising:
a central processing unit (CPU);
a dynamically reconfigurable circuit of which a circuit configuration can be configured dynamically;
a memory storing first configuration data for configuring a first parameter output circuit which outputs a first parameter as a fixed value, second configuration data for configuring a second parameter output circuit which outputs a second parameter as a fixed value, and third configuration data for configuring a data processing circuit which performs data processing using the first parameter or the second parameter; and
a configuration controller which configures the first parameter output circuit in the dynamically reconfigurable circuit using the first configuration data stored in the memory, and configures the data processing circuit in the dynamically reconfigurable circuit using the third configuration data stored in the memory,
wherein the data processing circuit configured in the dynamically reconfigurable circuit performs data processing using the first parameter outputted from the first parameter output circuit configured in the dynamically reconfigurable circuit,
wherein the configuration controller, when the data processing to be performed by the data processing circuit is changed from the data processing using the first parameter to the data processing using the second parameter, reconfigures the second parameter output circuit in the dynamically reconfigurable circuit using the second configuration data stored in the memory, without reconfiguring the data processing circuit,
wherein the data processing to be performed by the data processing circuit is image processing for copying, and
wherein a change by the data processing circuit from image processing using the first parameter to image processing using the second parameter is performed due to a change from color copy to monochrome copy or a change from monochrome copy to color copy.

2. The data processing apparatus according to claim 1,
wherein the data processing to be performed by the data processing circuit is filter processing,
wherein the first parameter output circuit outputs a first filter coefficient value used in the filter processing, and
wherein the second parameter output circuit outputs a second filter coefficient value used in the filter processing.

3. The data processing apparatus according to claim 1, further comprising:
a scanner which scans an image of an original; and
a printer which prints an image on a printing material,
wherein the CPU instructs the scanner to scan an image in accordance with completion of configuration of the first parameter output circuit and the data processing circuit by the configuration controller,
wherein the data processing circuit performs image processing using the first parameter outputted from the first parameter output circuit to image data generated by scanning the image of the original by the scanner in accordance with the instruction, and
wherein the printer prints based on image data after the image processing has been performed by the data processing circuit.

4. The data processing apparatus according to claim 3,
wherein the CPU instructs the scanner to scan an image in accordance with completion of reconfiguration of the second parameter output circuit by the configuration controller, and
wherein the data processing circuit performs image processing using the second parameter outputted from the second parameter output circuit to image data generated by scanning the image of the original by the scanner in accordance with the instruction.

5. A method of controlling an image processing apparatus including a central processing unit (CPU), a dynamically reconfigurable circuit of which a circuit configuration can be configured dynamically, a memory, and a configuration controller, the method comprising:
storing, with the memory, first configuration data for configuring a first parameter output circuit which outputs a first parameter as a fixed value, second configuration data for configuring a second parameter output circuit which outputs a second parameter as a fixed value, and third configuration data for configuring a data processing circuit which performs data processing using the first parameter or the second parameter,
configuring, with the configuration controller, the first parameter output circuit in the dynamically reconfigurable circuit using the first configuration data stored in the memory, and configuring the data processing circuit in the dynamically reconfigurable circuit using the third configuration data stored in the memory,
performing, with the data processing circuit configured in the dynamically reconfigurable circuit, data processing using the first parameter outputted from the first parameter output circuit configured in the dynamically reconfigurable circuit, and
reconfiguring, when the data processing to be performed by the data processing circuit is changed from the data processing using the first parameter to the data processing using the second parameter, the second parameter output circuit in the dynamically reconfigurable circuit using the second configuration data stored in the memory, with the configuration controller, without reconfiguring the data processing circuit, wherein the data processing to be performed by the data processing circuit is image processing for copying, and wherein a change by the data processing circuit from image processing using the first parameter to image processing using the second parameter is performed due to a change from color copy to monochrome copy or a change from monochrome copy to color copy.

6. A data processing apparatus comprising:

a central processing unit (CPU);

a dynamically reconfigurable circuit of which a circuit configuration can be configured dynamically;

a memory storing first configuration data for configuring a first parameter output circuit which outputs a first parameter as a fixed value, second configuration data for configuring a second parameter output circuit which outputs a second parameter as a fixed value, and third configuration data for configuring a data processing circuit which performs data processing using the first parameter or the second parameter; and a configuration controller which configures the first parameter output circuit in the dynamically reconfigurable circuit using the first configuration data stored in the memory, and configures the data processing circuit in the dynamically reconfigurable circuit using the third configuration data stored in the memory, wherein the data processing circuit configured in the dynamically reconfigurable circuit performs data processing using the first parameter outputted from the first parameter output circuit configured in the dynamically reconfigurable circuit, wherein the configuration controller, when the data processing to be performed by the data processing circuit is changed from the data processing using the first parameter to the data processing using the second parameter, reconfigures the second parameter output circuit in the dynamically reconfigurable circuit using the second configuration data stored in the memory, without reconfiguring the data processing circuit, wherein the data processing to be performed by the data processing circuit is filter processing, wherein the first parameter output circuit outputs a first filter coefficient value used in the filter processing, and wherein the second parameter output circuit outputs a second filter coefficient value used in the filter processing.

7. A method of controlling an image processing apparatus including a central processing unit (CPU), a dynamically reconfigurable circuit of which a circuit configuration can be configured dynamically, a memory, and a configuration controller, the method comprising:

storing, with the memory, first configuration data for configuring a first parameter output circuit which outputs a first parameter as a fixed value, second configuration data for configuring a second parameter output circuit which outputs a second parameter as a fixed value, and third configuration data for configuring a data processing circuit which performs data processing using the first parameter or the second parameter, configuring, with the configuration controller, the first parameter output circuit in the dynamically reconfigurable circuit using the first configuration data stored in the memory, and configuring the data processing circuit in the dynamically reconfigurable circuit using the third configuration data stored in the memory, performing, with the data processing circuit configured in the dynamically reconfigurable circuit, data processing using the first parameter outputted from the first parameter output circuit configured in the dynamically reconfigurable circuit, and reconfiguring, when the data processing to be performed by the data processing circuit is changed from the data processing using the first parameter to the data processing using the second parameter, the second parameter output circuit in the dynamically reconfigurable circuit using the second configuration data stored in the memory, with the configuration controller, without reconfiguring the data processing circuit, wherein the data processing to be performed by the data processing circuit is filter processing, wherein the first parameter output circuit outputs a first filter coefficient value used in the filter processing, and wherein the second parameter output circuit outputs a second filter coefficient value used in the filter processing.

* * * * *